March 23, 1926. 1,577,549
W. H. WINSLOW
BOILER
Filed Dec. 12, 1919 6 Sheets-Sheet 1

Inventor
William H. Winslow
By Brown Boettcher & Oemer
Attorneys

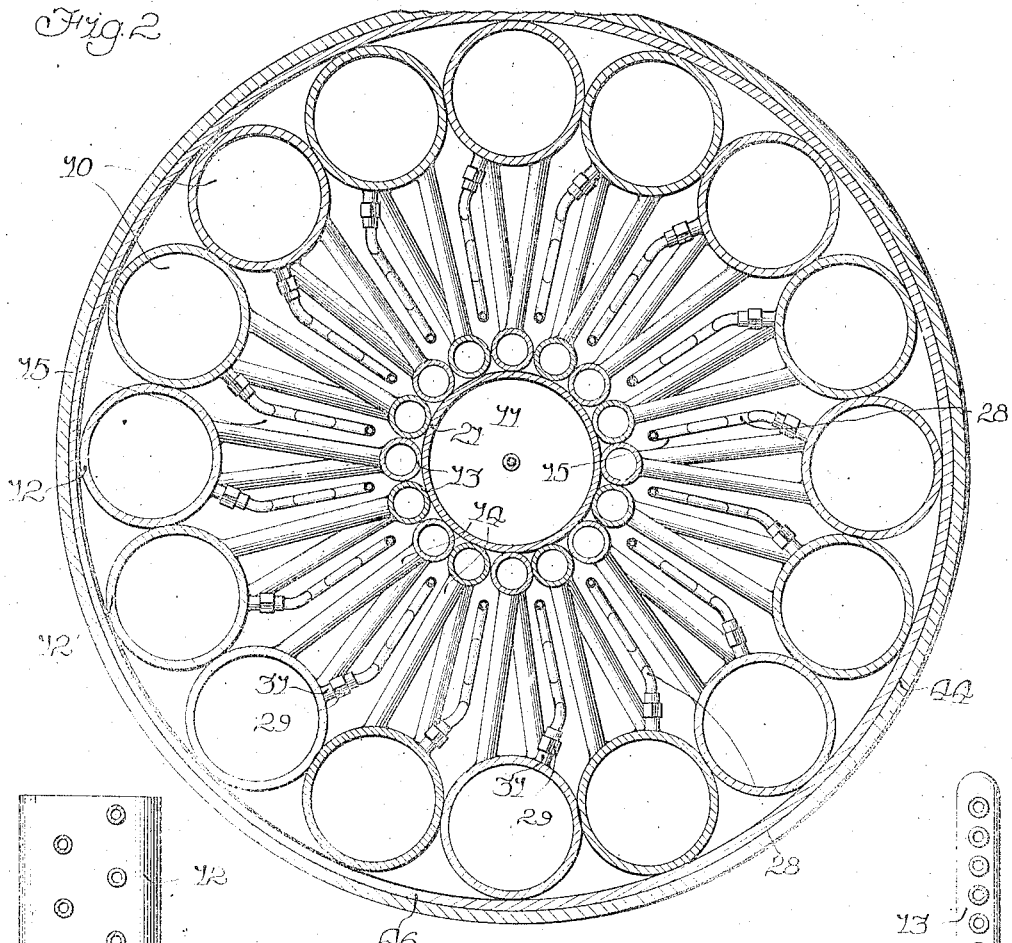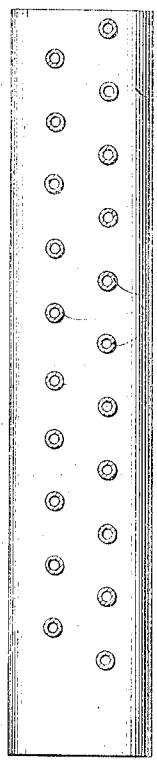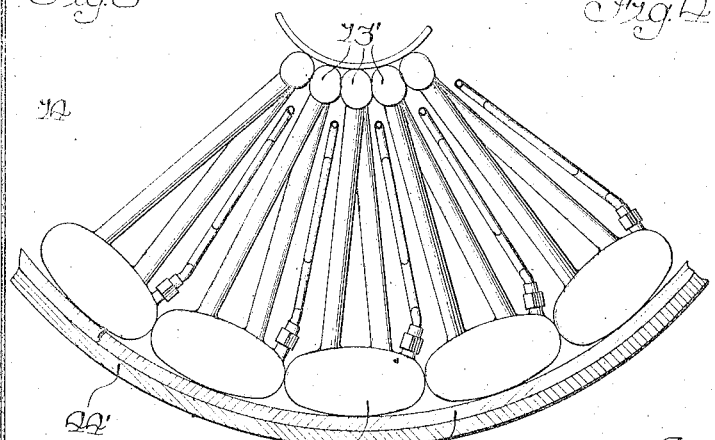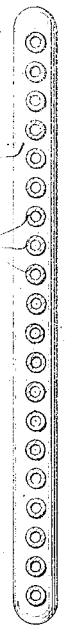

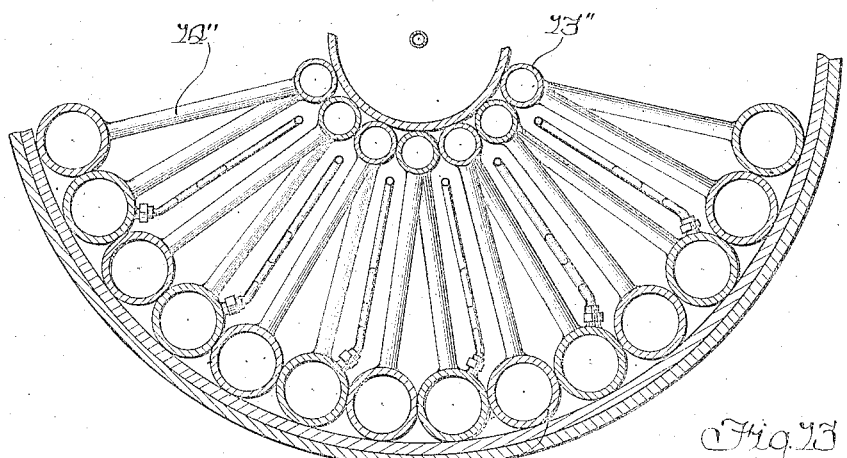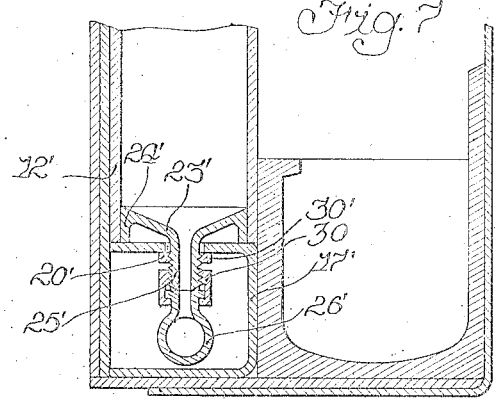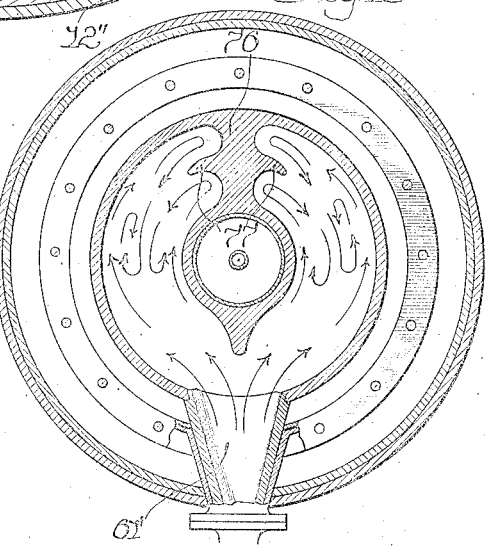

March 23, 1926. 1,577,549

W. H. WINSLOW

BOILER

Filed Dec. 12, 1919 6 Sheets-Sheet 4

Inventor
William H. Winslow
By Brown Boettcher Drewer
Attorneys

March 23, 1926.
W. H. WINSLOW
BOILER
Filed Dec. 12, 1919    6 Sheets-Sheet 5
1,577,549
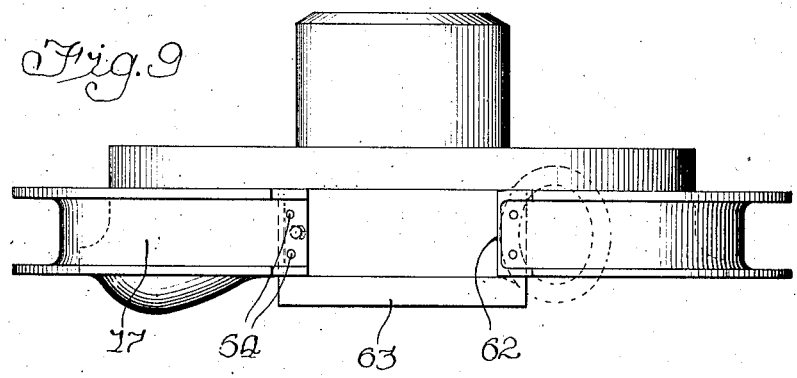
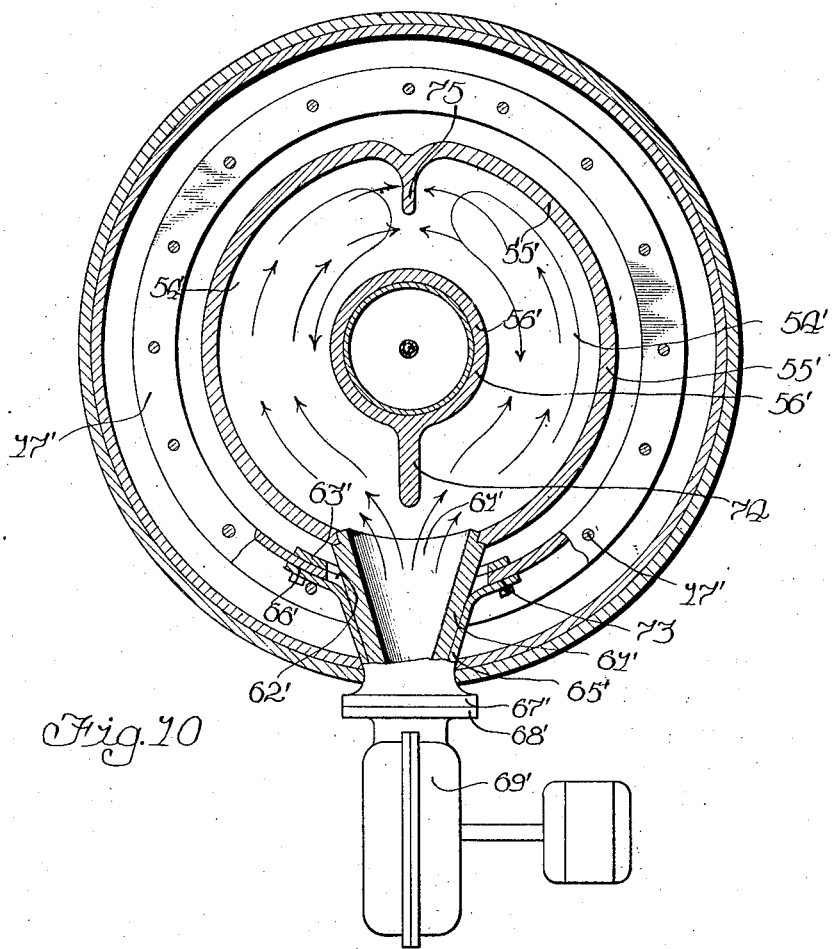

March 23, 1926.

W. H. WINSLOW

BOILER

Filed Dec. 12, 1919

Inventor
William H Winslow
By Brown Boettcher & Dienner
Attorneys

Patented Mar. 23, 1926.

1,577,549

UNITED STATES PATENT OFFICE.

WILLIAM H. WINSLOW, OF RIVER FOREST, ILLINOIS, ASSIGNOR TO WINSLOW SAFETY HIGH PRESSURE BOILER COMPANY, OF CHICAGO, ILLINOIS, A CORPORATION OF ILLINOIS.

BOILER.

Application filed December 12, 1919. Serial No. 344,355.

*To all whom it may concern:*

Be it known that I, WILLIAM H. WINSLOW, a citizen of the United States, residing at River Forest, in the county of Cook and State of Illinois, have invented a certain new and useful Improvement in Boilers, of which the following is a full, clear, concise, and exact description, reference being had to the accompanying drawings, forming a part of this specification.

My invention relates to boilers.

The present construction of boiler has been conceived with the primary object of providing a boiler capable of successfully meeting all of the exacting requirements found in steam vehicle practice. It is to be understood, however, that the novel features of the invention may be embodied in boilers designed and constructed for other utilities as well.

The requirements which make the problem of the steam vehicle boiler more difficult to solve than any other type, arise principally from space limitations, the necessity of an essentially light weight construction, the variable nature of the vehicle propelling load, and the imperative necessity of being able to generate steam quickly. The following illustrate the more important requisites of a boiler intended for use in a steam propelled vehicle.

1. A large ratio of heating surface relative to the limited size and circumscribed form of the boiler;
2. Rapid steaming capacity;
3. Ability to meet widely fluctuating load demands, and to supply abnormally large quantities of steam without priming;
4. Relatively large water content for reserve accumulation of heat energy;
5. Heat economy;
6. Safety under high pressures;
7. Minimum weight and size and general conformation suitable to compact location in steam vehicles;
8. Complete combustion in the limited combustion space available, with entire absence of smoke or soot;
9. Sectional construction, and capable of convenient repair or replacement of a section.

The boiler is of cylindrical formation, and is of sectional, water tube construction. The boiler sections extend radially from the center of the boiler; and in their preferred embodiment each section comprises two or more substantially vertical headers joined by a plurality of connecting tubes. A peculiar and novel relation exists between the circular formation of the boiler and the radial sectional construction, to wit: it permits of a very desirable proportioning of the dimensions of the headers and tubes to the end of obtaining a ratio between the headers and tubes of maximum thermal efficiency, whereby each part of the section has the proper capacity, rate of circulation, and heat absorption consistent with its intended functional relation to the remainder of the sections. This will be more apparent by considering the relation between the outer and inner headers in the present boiler sections. The outer headers are disposed substantially in contact to form an outer circular water wall which defines the outside of the boiler, and likewise, the inner headers are disposed substantially in contact to form an inner circular water wall. By reason of their greater distance from the center of the boiler, the outer headers are of much larger size than the inner headers and consequently have a larger volume and lower rate of circulation than the inner headers. The relatively large volume of the outer headers affords a quiescent water and steam space which is substantially free from violent agitation, and which is ideally adapted to the withdrawing of steam with minimum degree of priming. Conversely, the relatively small volume of the inner headers results in a high rate of circulation and a violent ebullition therein, which is particularly adapted to the steam freeing and water circulating action desired. The relation of the inner and outer headers to the combustion areas is also made conducive to relatively higher rate of heat absorption by the inner headers. A desirable proportioning of the dimensions of the connecting tubes with relation to the headers is also made possible by the circular arrangement of the sections. Particularly, it permits of a relatively short length of connecting tube without diminishing the total heating area as in other types of boilers. A circulating tube of short length relative to its sectional area has a steadier and more efficient steaming action that a tube of long length relative to the sectional area for the reason that it is more capable of quietly discharging the steam freed therein without disturbing the steaming action of the water remaining in the tube. When working a long circulating tube at a high steaming rate, there is a tendency for the steam to be generated in larger volumes than the tube can properly discharge, and as a consequence the steam produces an explosive ejection of the water and steam from both ends of the tube which results in an irregular fluctuating action of the tube.

The combustion area of the boiler is confined entirely within the circular formation of the boiler and is substantially surrounded by the header walls so that the boiler is actually internally fired. This internally fired construction increases the effective heating surface considerably by utilizing practically every surface against which the gases impinge as a heating surface. Owing to the relatively small size of the boiler and the fact that the combustion chamber is completely enclosed therein, the combustion area is entirely disproportionate to the area generally required for burning equal amounts of fuel, but notwithstanding these limitations, the combustion of fuel is completed without the production of smoke or soot by a particularly novel method of burning the fuel which I shall hereinafter describe.

The boiler and burner which I have disclosed in the accompanying drawings illustrates a preferred construction, primarily designed for use in a steam driven automobile power plant, but as I have previously remarked, it is to be understood that the underlying theory and the fundamental structure of the boiler can be embodied in boilers generally, without departing from the spirit and scope of the invention.

In the drawings:

Figure 2 is a horizontal sectional view of the same;

Figure 3 is an elevational view of one of the outer headers, showing the staggered relation of the connecting tubes;

Figure 4 is a similar view of one of the inner headers;

Figure 5 is a fragmentary plan view illustrating a modified formation of the inner and outer headers;

Figure 6 is a horizontal sectional view illustrating still another modified construction of the boiler sections;

Figure 7 is a detail section of a modified type of feed water connection;

Figure 9 is a side elevational view of the combustion chamber supported in the base ring which carries the boiler sections;

Figure 10 is a view similar to Figure 8, illustrating a modified construction of burner;

Figure 13 is a view similar to Figure 10, illustrating still another modified construction of burner.

Figure 1:
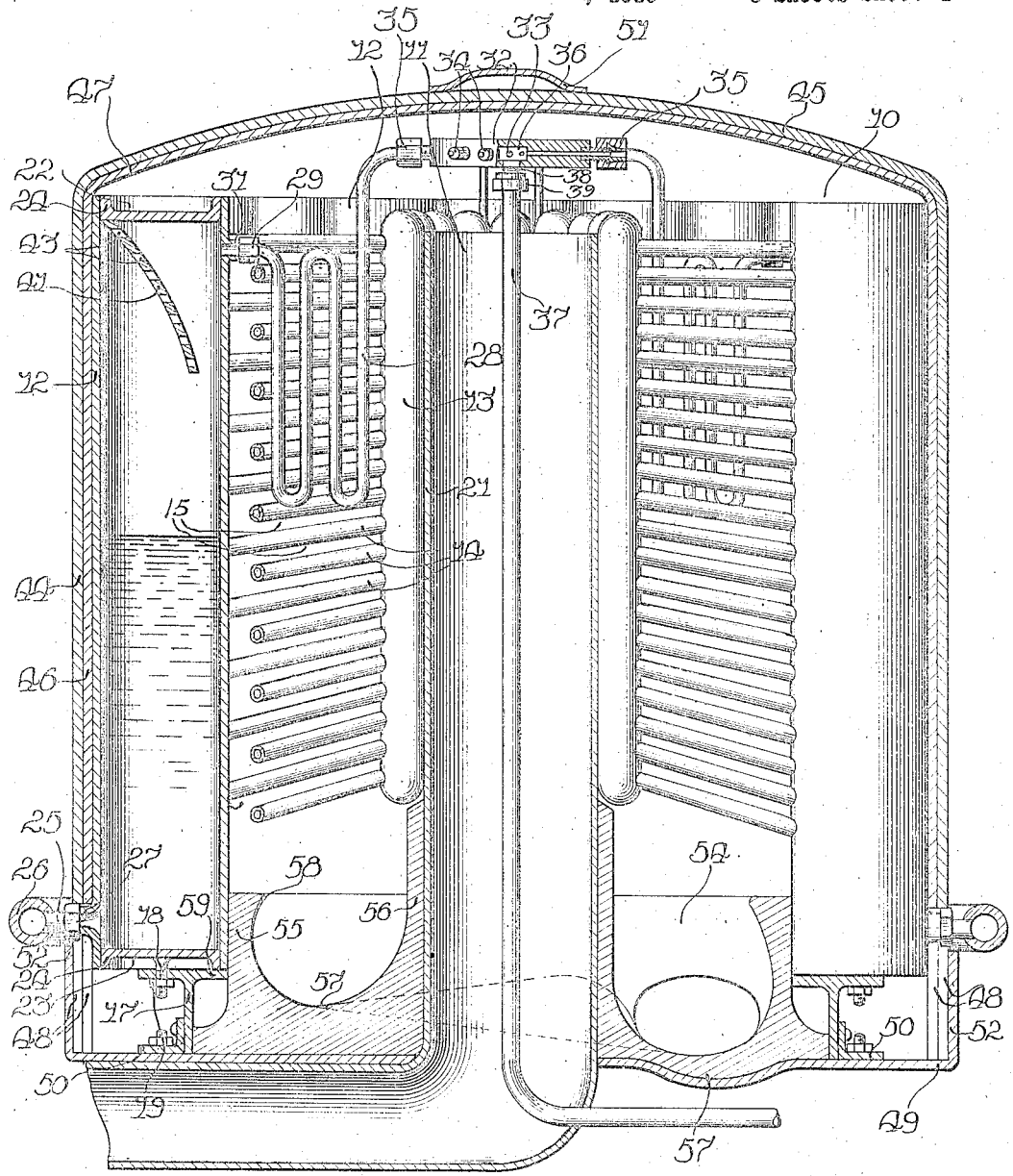
Figure 1 is a vertical sectional view of the boiler.

Referring to Figures 1 and 2, the boiler is composed of a plurality of vertical sections, each designated 10 in its entirety, which are arranged in circular formation, each section radiating from a central exhaust flue 11. The sections are substantially identical and comprise a long outer header 12 of relatively large diameter, and a short inner header 13 of relatively small diameter, these headers being joined by a plurality of short cross tubes 14. The outer headers 12 are placed in contact so as to form a substantially closed ring of headers, which constitutes the circular outer water wall of the boiler. The inner headers 13 are also placed in contact to form a substantially closed inner ring of headers, which constitutes the inner circular water wall defining the central exhaust flue 11. Between the outer and inner water walls is defined a vertical flue space 15 of ring-shape conformation through which pass the products of combustion from the annular fire box below. The circulating tubes 14 are interspersed across this flue space 15, the tubes of each section extending substantially radially across the flue space between the outer and inner headers.

The joining of the circulating tubes 14 to the headers 12 and 13 is preferably by autogenous welding so as to produce an integral unit of each section. It will be noted from Figure 1 that these tubes are inclined at an increasing angle from the top to the bottom of the sections; this is for the purpose of securing a highly efficient steam producing and steam freeing circulation, which I shall hereinafter describe, and which I have disclosed fundamentally in my prior Patent, No. 1,237,233, issued August 14, 1917.

The circulating tubes 14 are staggered laterally or divergingly from the inner header 13, to the larger outer header 12. As shown in Figure 4 the tubes 14 are welded to the relatively small inner header 13 in a substantially contiguous row from which they diverge alternately to the right and to the left and are welded to the outer header 12 in two staggered rows as shown in Figure 3. The reason for diverging these tubes in a lateral stagger is primarily to avoid the formation of large flue spaces between the sections which would otherwise result from the radial divergence between the sections;

and second to destroy the closely grouped tier effect of the tubes with the consequent ineffective circulation of the flue gases between the tubes. The number of staggered rows which may be provided may be varied. This lateral stagger of the tubes furthermore increases the structural strength of the boiler sections against expansion stresses, and from the fact that these tubes entirely support the inner header 13 the stagger thereof increases the lateral strength of the tubes for supporting the header.

The boiler setting is upon a circular supporting T-bar 17 upon which rests the outer ring of headers 12. The headers 12 are rigidly supported upon the bar 17 by threaded studs 18 which project down from the bottom of the headers through holes in one of the flanges of the T-bars 17 where they are clamped by nuts 19. The tendency of the sections to incline inwardly under the hanging weight of the projecting tubes and inner headers is overcome by the provision of the central flue pipe 21 which extends up in the closed ring of inner headers 13 and thus sustains the sections against tipping inwardly.

The outer headers 12 consist of wrought metal drums having open ends in which are welded the end heads 22 and 23. These heads are set back into the ends of the drums and have lateral flanges 24 which are welded to the inner circumferences of the drums. It will be apparent that by this arrangement the process of welding the end heads in the drum is greatly facilitated by reason of the access afforded to both sides of the welded joint and also to the ability to put the weld under pressure. The inner headers 13 consist of wrought metal tubes, the ends of which are swaged over and are welded solid to close off the ends of the headers. The studs 18, by which the headers are mounted on the circular channel 17, are preferably made integral with the lower heads 23.

Each of the boiler sections 10 has an independent feed water connection 25 with a common feed water pipe 26 which encircles the boiler. The feed water connection 25 preferably consists of a short nipple 2 which is welded to the outer header drum, a union 27 being provided to permit of convenient connection and disconnection of the nipple from the feed water pipe 26 for removing and replacing the section.

I also contemplate locating the feed water pipe under the outer wall of headers as shown in Figure 7. In this modification the circular supporting channel 17' is made considerably higher than in the previous embodiment and the upper flange thereof is provided with relatively large openings 20' for receiving the downwardly extending feed water connections 25'. The feed water connection 25' is preferably made integral with the lower end head 23', the upper surface of which is preferably sloped downwardly and centrally to discharge the scale tending to accumulate thereon down thru the feed water connection 25'. The end head 23' is also provided with a depending peripheral flange 24' which is welded to the header 12' as previously described. The feed water connection 25' is threaded to receive a nut 30' which is adapted to be drawn up tight against the upper flange of the channel 17' to rigidly support the header. The end of the connection 25' is joined to the feed water pipe 26' by a union. The pipe 26' is preferably constructed in two semicircular sections which are bolted or otherwise connected together. The boiler is not completely filled with water, but only partially filled, somewhat as indicated in the sectioned header 12. A definite water level is not imperative as this may vary to a considerable degree without affecting the working of the boiler.

Each of the boiler sections 10 is provided with a separate superheating tube 28 thru which the steam is discharged from the section. The superheating tubes 28 are disposed between the boiler sections and are shaped into the form of a sinuous coil having a series of vertical loops to provide an extensive superheating area. The superheating coil 28 has releasable coupling thru a union 29 with a nipple 31 which is welded integrally to the header adjacent the upper end thereof. The nipple 31 and union 29 project diagonally from the header 12 so as to avoid interference with the uppermost circulating tube, and so as to enable the union 29 to be disconnected with facility. The inner end of each superheating coil 28 rises above the sections and has connection with a central steam manifold 32 which is disposed directly over the exhaust flue 11 where it is subject to the heat of the hot gases in the top of the furnace. This steam manifold consists of a solid disc of metal provided with a plurality of radial steam passages 33 arranged for connection with the several superheating coils 28 thru threaded studs 34 projecting from the periphery thereof. The coupling unions 35 secure a steam tight joint by drawing the end of the superheater tube up over the tapered end of the stud 34 as illustrated in section. The radial steam passages 33 converge into a common central steam chamber 36 which has connection to the steam supply pipe 37 thru the threaded stud 38 and union 39. The supply pipe 37 extends vertically downward thru the center of the exhaust flue 11 and laterally thru the bottom thereof to the engine throttle or other point of steam consumption. The flue pipe 21 is extended down thru the center of the fire box and is bent laterally backwards below the boiler so as to have it exhaust to the rear and beneath the vehicle and thereby secure the inductive effect of the air passing by the end of the exhaust flue. The closed ring of inner headers 13 forms an effective exhaust flue, and the upper portion of the flue pipe 21 may therefore be eliminated from between the headers, if desired, for the purpose of more effectively exposing the headers 13 to the heat of the exhaust gases.

Referring again to the sectional illustration of the outer header 12 as shown in Figure 1, it will be noted that the upper end of the header, from whence the steam is withdrawn, is separated from the lower water area of the header by an inclined deflecting baffle 41. This deflecting baffle preferably consists of a perforated plate of generally elliptical formation which is welded in the upper end of the header on an inward and downward inclination with its lower edge slightly spaced from the inner wall of the header. This lower edge is spaced from the inner wall of the header so as not to impede the discharge of water from the uppermost tubes 14 down into the header 12. The baffle perforations 43 extend thru the baffle substantially horizontally so as to prevent the passage of water up thru the baffle during the splashing of the water against the same, but not to hinder the flow of steam to the superheating coil 28. There is small likelihood of any of the water splashing up thru the restricted space between the baffle 41 and the inner wall of the header and being caught in the open end of the steam connection 31 because of the vertical motion of the water, which would not allow it to trap in the horizontal steam outlet 31. The very much larger volume of the outer header 12 and the fact that this header is not heated as highly as the inner header 13 results in the water and steam therein being in a relatively quiescent condition even during extremely rapid working of the boiler. It will hence be seen that the triangular steam pocket in the upper end of the header 12 is substantially free from water either from ebullition or the physical jarring of the boiler, and consequently the tendency of the boiler to prime is reduced to a minimum even during extremely rapid working of the boiler.

From the fact that the inner and outer water walls constitute very effective insulating walls for preventing the radiation of heat, the problem of insulating and housing the boiler is made relatively simple. The boiler is enclosed in a cylindrical metal shell or casing 44, which fits down over the ring of outer headers 12, and which is formed with an arched dome shaped top 45 for closing off the top of the boiler. The interior of the shell 44 is preferably lined with a suitable insulating material 46 for preventing the loss of any heat which might permeate out between the outer headers 12. If a greater degree of heat insulation is desired, a suitable heat insulating material may be filled in in the vertical spaces between the casing 46 and the pairs of adjacent headers 12. In the dome shaped top 45 the insulation is preferably increased in thickness as indicated at 47 to prevent the outward radiation of any heat accumulating in the top of the boiler. The lower edge of the shell 44 is provided with a plurality of vertical slots 48 for engaging over the feed water connections 25 of the outer headers 12. The lower edge of the casing 44 rests on a circular plate 49 which functions as a supporting base for the boiler, and to which is bolted the supporting bar 17 through the medium of a ring-shaped angle iron 50 which is secured to the T-bar 17. The plate 49 is formed with an upwardly turned flange 52 which embraces the bottom of the casing 44 and closes off the vertical slots 48. At its top the shell or casing 44 is provided with a handle 51 for facilitating removal thereof.

I shall now describe the burner apparatus, making particular reference to the form of fire box or combustion chamber, and the novel method of burning the fuel whereby the large quantities of fuel required are burned in the very confined combustion space without the production of smoke or soot. The present invention is not directly concerned with such parts of the burner apparatus as are employed for the generation of the combustible mixture and the automatic igniting of the same under the control of boiler conditions, and this latter apparatus will therefore not be described. Though the present form of burner apparatus and the particular method of burning the fuel has novel correlation with the circular formation of the present boiler, I wish it to be understood that there is no invariable dependency between the boiler and the particular form of burner, and that other forms of burner may be employed for heating the boiler if desired, or other forms of boilers may be heated by this burner, but there is a novel and useful relation between the present burner and the particular form of boiler.

The fire box or combustion chamber consists of a circular chamber 54 composed of a suitable heat refractory material which is mounted on the base plate 49 and is entirely surrounded by the outer water wall. This combustion chamber preferably comprises an outer circular wall 55, an inner circular wall 56 surrounding the exhaust flue pipe 21, and a curved bottom wall 57, the upper surface of which rises in the form of a slowly ascending helix as denoted from the dotted line in Figure 1, for a purpose which I shall presently describe. The inner wall 56 extends up around the exhaust flue pipe 21 and terminates substantially in contact with the ring of inner headers 13 so as to prevent the outward loss of heat thru the exhaust flue. The outer wall 55 of the combustion chamber is in contact with the outer wall of headers 12, and is provided with a gradually inwardly curved lip 58 adjacent its upper edge to deflect the burning mixture and the products of combustion inward and away from contact with the outer wall of headers 12 which are relatively cool at their lower ends. The triangular interstices between the headers and the outer wall 55 of the combustion chamber are closed off at the bottom of the headers by the flange 59 on the T-bar 17, but if desirable, further heat insulation may be provided by the filling in of these triangular interstices with fire clay or the like. The combustion chamber 54 is supported by the base plate 49 which also protects the bottom of the combustion chamber against mechanical fracture.

Figure 8:
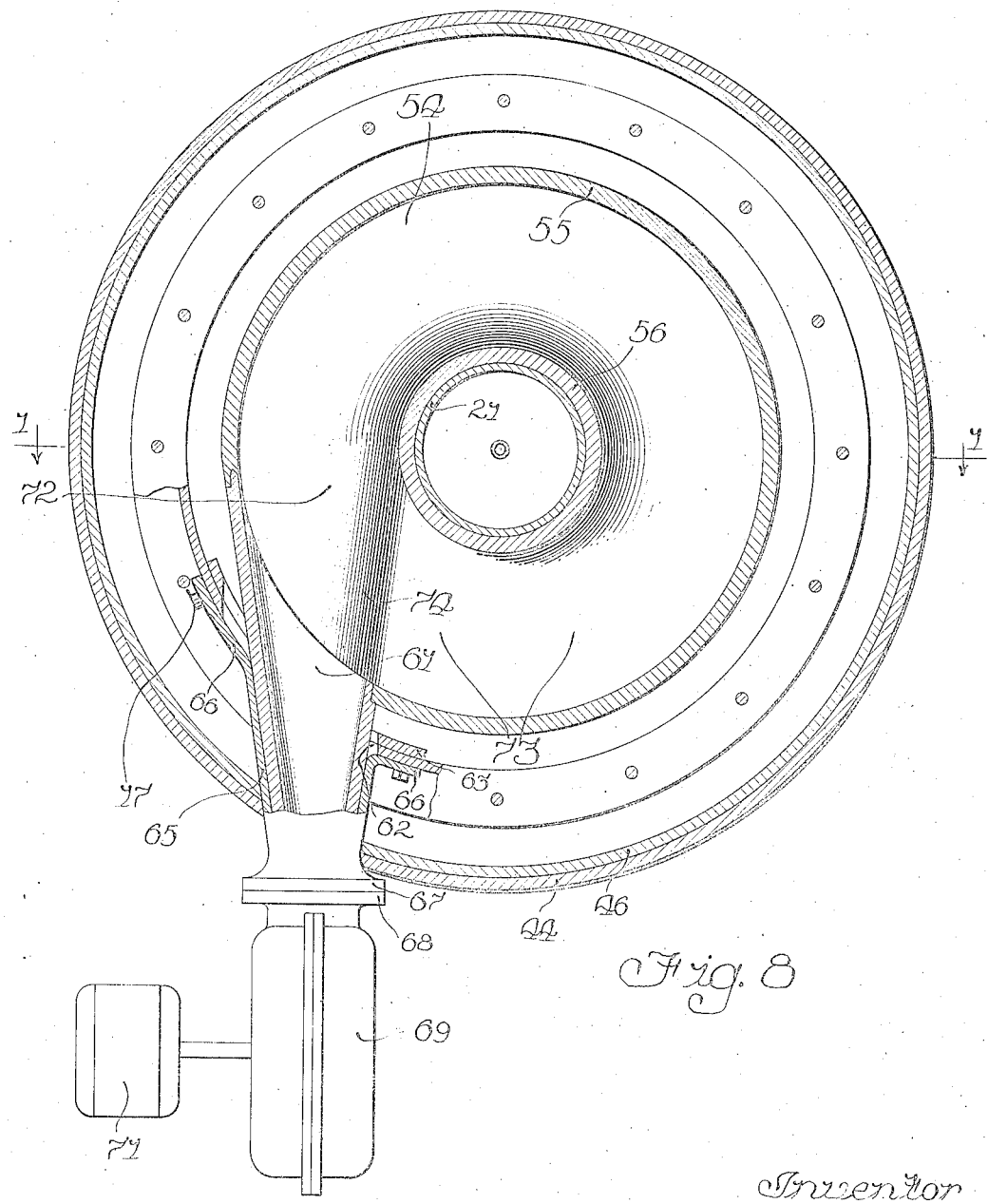
Figure 8 is a horizontal sectional view thru the boiler, illustrating the improved construction of burner.

As shown best in Figures 1 and 8 the combustible mixture is injected substantially tangentially into the circular combustion chamber 54 thru a Venturi or nozzle tube 61 which discharges into the combustion chamber below the outer ring of headers 12. To permit the passage of the Venturi tube 61 into the combustion chamber, a portion of the supporting T-bar 17 is cut away as indicated at 62 (Figures 8 and 9) thru which the Venturi tube extends tangentially. The separated ends of the supporting T-bar 17 are rigidly joined by a yoke-shaped connecting member 63, the ends of which are riveted to the web of the T-bar as indicated at 64. The discharge end of the Venturi tube or nozzle 61 is contracted in its vertical dimension so as to shape the large discharge mouth into elliptical formation to permit the insertion of the venturi between the lower edge of the outer water wall and the bottom of the combustion chamber. It will be noted that the yoke-shaped connecting member 63 is dropped below the plane of the supporting T-bar 17 to afford maximum room for the insertion of the Venturi tube. This Venturi tube is composed of a suitable refractory material capable of withstanding the temperatures prevailing therein from the issuing flame; and to support this refractory Venturi tube and protect it against mechanical injury there is provided a metallic shell 65 which surrounds the same and has flanges 66 for bolting to the web of the T-bar as clearly shown in Figure 8. The shell 65 projects out tangentially from the outer water wall where it is provided with a flange 67 to which is bolted the flange 68 of the motor driven blower 69. The discharge end of the refractory Venturi tube is joined with the combustion chamber 54 in any preferred manner, preferably by means of a joint 70 which is made flame and heat tight by a reenforcement of fire clay or the like. The refractory Venturi tube 61 extends up into the Venturi formation of the shell 65 to approximately the most constricted part of the Venturi throat where the liquid fuel nozzle or other supply means is situated. In the more advanced practice of steam driven vehicles the fuel supply means is provided with automatically operated apparatus for starting and stopping or otherwise controlling the supply of fuel to the burner in accordance with boiler and burner conditions, and is also provided with means for momentarily enriching the combustion mixture or initiating a separate ignition mixture at starting to facilitate ignition. This portion of the burner apparatus is foreign to the present invention and need not be illustrated or described in detail.

For the purposes of disclosing the present invention suffice it to say that the blower 69 is driven by an electric motor 71 under manual or automatic control, and that the air impelled from this blower is intimately commingled with the liquid fuel projected from the fuel supply means for the purpose of forming a combustible mixture, which is then projected into the combustion chamber 54.

The method of burning the fuel after its injection into the combustion chamber is as follows:

In discharging from the Venturi tube 61 the combustible mixture enters the combustion chamber at the lowest point of the helical or spiral bottom of the chamber. As has been previously described, the bottom wall or surface of the combustion chamber rises in a gradual, uniform spiral or helix from the lowest point at which the combustible mixture enters, designated 72, thru approximately a complete circle to the highest point designated 73. 74 denotes the sloping wall between the high and low points of the helical bottom of the chamber. As the flame is impelled into the combustion chamber it strikes the circular outer wall thereof and partakes of a revolving helical motion under the influence of the helical bottom of the combustion chamber and slowly rises in an ascending helix to the circulating tubes 14. The centrifugal inertia of the revolving gases confines the greater volume thereof in contact with the outer wall of the combustion chamber and in their spiral ascension these gases encounter the inwardly curved lip 58 from which they are deflected inwardly to prevent their coming in contact with the heat absorbing surfaces of the outer headers before complete oxidation of the combustible constituents. The combustion interval between the time the burning mixture is injected into the combustion chamber from the Venturi 61 and the time it comes into contact with the lowermost circulating tubes 14, is dependent mainly upon the vertical distance between the two, upon the pitch of the helical bottom of the combustion chamber, and upon the velocity of the entering mixture. The inherent tendency of the flame to rise is overcome by the velocity of the same, which tends to keep it rotating in a substantially horizonal plane. The helical path formed by the flame does not tend to retard the velocity of the same as would a reversing path of travel, and consequently the velocity of the flame is sustained for a considerable period. The centrifugal inertia created in the revolving flame impels the larger unburned particles of fuel outward into contact with the outer chamber wall 55, the surface of which is at a temperature of incandescence, and consequently these particles of fuel immediately volatilize and ignite. Another notable characteristic is that as a result of the revolving motion of the gases the gases come into contact with the circulating tubes 14 while moving with a partly horizontal motion and thus permeate horizontally thru the entire nest of tubes rather than up vertically thru the flue spaces therebetween. Moreover, the revolving motion of the gases effects an equalization of pressure over the entire burner area and insures uniform heating of the boiler. The gases ascend up thru the nest of tubes 14, coming into intimate contact with the tops and bottoms of the tubes as well as the sides by reason of their partly revolving motion, and finally pass down centrally thru the exhaust flue 11 where they release their remaining heat to the inner headers 13. The pressure with which the fuel is injected and the provision of the downdraft exhaust flue 11 result in the maintenance of a slight pressure in the boiler flues at all times.

It will be apparent that the preceding method of burning fuel obtains a maximum extent of flame space and a maximum combustion interval from a very confined combustion area. The fundamental theory underlying the efficacy of this method is the injecting of fuel tangentially into a substantially circular combustion chamber and burning it while revolving in the chamber. The helical path of the flame is but a secondary factor in contributing to this end and may be eliminated if desired by forming the bottom of the combustion chamber substantially flat. The principal advantage of the rising helical motion of the gases is to avoid the interference and confusion of the gases caused by the gases revolving around the combustion chamber and breaking into the entering stream of gases. It is to be understood that this method of burning a fuel may be extended to widely different fuels including powdered or pulverized coal.

It will be seen from the action of the burner that the lower central portion of the boiler will be heated intensely by the ascending gases. This portion includes the lowermost circulating tubes and the inner wall of headers 13. As a result, steam will be formed in these tubes and headers, and, due to two distinct actions, circulation of the water in the boiler will take place. The first action is a diminution of the density of the water by expansion when heated. The second effect is a diminution of the specific gravity of a column of water due to the space taken up by steam bubbles. This causes the column of water in the inner header 13 to become of considerably less density than the comparatively cold water in the outer header 12. As a consequence, the level of water in the two headers will not be the same, the column rising higher in the header 13 than in the header 12. As a result of this action the water will tend to flow back to the header 12, thru the inclined intermediate circulating tubes 14. Instead of having a definite water level in both sides, as indicated in the sectioned header 12, the level will vary and will be indefinable in the inner header 13 because of the fact that violent ebullition is taking place in this header to such an extent that some of the water is cast up in the header 13 in proximity to the uppermost group of tubes. Some of the water is caught in the mouths of the inclined tubes and runs back in thin sheets or streams thru the tubes, which are highly heated, so that a mechanical sifting of the steam from the water is effected by the action of the water in running down an incline in a thin stream, and furthermore, such water is also flowing over a very hot metallic plate in a thin sheet with a free steaming surface in ideal condition for the rapid formation of steam.

The relative dimensions of the tubes 14 have an important relation in the action of the boiler. It will be noted that these tubes are of comparatively short length with a consequently large sectional area relative to the length of the tubes. The short length of the tubes and their relatively large sectional area afford a steadier steaming action for the following reasons: First, the tubes have a larger steam freeing capacity and are more capable of discharging the steam without disturbing the steaming action of the water remaining in the tubes. It the case of a long tube of relatively small sectional area the great length of the tube has a tendency to generate or free a greater volume of steam than the restricted area of the tube can discharge quietly, with a consequent blowing of the entire charge of water and steam from the ends of the tube. Obviously, this is not conducive to steady, rapid steaming. Second, the relatively larger sectional area affords a more extensive heating surface for heating the streams of water coursing down thru the tubes. From the mechanical aspect, these tubes can withstand much higher heating owing to the decreased longitudinal expansion resulting from the short length of the same. The slight expansion of these relatively short tubes is taken up by the outward expansion of the outer casing 44 and by the inward contraction of the central flue pipe 21 under the pressure of the headers.

The comparative dimensions of the outer header 12 and the inner header 13, relative to each other and to the cross tubes 14, also bears an important relation to the action of the boiler. As a result of the relatively large volume of the outer header 12, and the fact that this header is not heated to as high a degree as is the remainder of the section, the water in this header is substantially quiescent during even the most rapid steaming of the boiler, and consequently this outer header constitutes an ideal steam chamber from which to withdraw the steam from the boiler with minimum possibility of priming. The relatively large volume of the outer header 12 enables this header to receive the great quantity of circulating water from the tubes 14 in even the most rapid working periods of the boiler without agitation of the water in the header, or the destroying of the quiescent condition so favorable to the withdrawing of steam from the header. The large volume of the outer header also gives stability and steadiness to the action of the boiler in that the large volume of water in the lower end of the header functions as a heat reservoir for preventing irregular fluctuations of the boiler temperature, and that the large steam space in the upper end of the header affords capacity for the accumulation of a volume of steam capable of meeting sudden and large demands.

The relatively small area of the inner header 13 results in a violent ebullition of the water therein in even the lighter steaming periods of the boiler. It will be apparent from the relatively large area of the sum total of the cross tubes discharging water into the header as compared to the relatively limited area of the header, that water and steam will be discharged into the header at such a rate as to cause a violent agitation or tossing of the water up into the extreme upper end of the header. The rapid rate at which the water is discharged into the header 13 and the high boiling temperature of the header resulting from the intimate circulation of the heated gases past the same, together have the effect of insuring that the water is tossed up into even the uppermost tubes 14. These uppermost tubes of course do not receive the water in such volume as do the lower intermediate tubes, and from this fact these uppermost tubes ideally function as a drying zone for drying or partially drying the steam liberated in the inner header 13 and conducting it to the steam collecting space in the outer header 12. The final drying and superheating of the steam takes place in the superheating coil 28 from whence the steam is discharged thru the steam manifold 32 to the supply pipe 37.

It will be seen from the foregoing that the relative proportions between the inner and outer headers and the connecting tubes have a very important relation in the working of the boiler. The circular formation of the boiler permits the headers being constructed in different sizes and still being placed in contact to form solid water walls. This circular arrangement also permits of practically any ratio between the proportions of the headers and tubes, either by placing the wall of the inner headers closer to or further from the center of the boiler, or by the changing of the shapes of the headers and tubes into a configuration designed to give any desired proportion. For example, the outer headers may be constructed of elliptical section, as shown in Figure 5 with the major axes disposed tangentially to the ring of headers, and with the inner headers constructed of elliptical section with the major axes extending radially to the ring of headers.

Another modification of boiler section for obtaining a different relation between the inner and outer headers and the tubes is illustrated in Figure 6. In this form there are twice as many outer headers 12″ as there are inner headers 13″ and the outer headers 12″ are consequently of smaller diameter, which results in a decreased volume in the outer headers and also in slightly longer tubes 14″. The connecting tubes 14″ are diverged into separate groups which connect with separate outer headers 12″. It will hence be apparent that by changing the radial distances between the rings of headers; by giving one or both series of headers a special configuration; or by varying the number of outer headers to the number of inner headers, any desired proportion between the headers and tubes can be obtained.

In Figure 10 I have illustrated a modified form of burner differing mainly from the previous form in the angle of injection of the fuel and in the method of burning the fuel in the combustion chamber. In this modified form, the flame or combustible mixture is injected radially into the combustion chamber 54′ thru the radial Venturi tube 61′. This Venturi tube projects thru a radial opening 62′ in the supporting T-bar 17′ and is housed in a Venturi shell or casing 65', which is bolted to the web of the T-bar 17' as indicated at 73. The shell 65' is coupled by flanges 67' and 68' with the discharge outlet of the motor driven blower 69'. In form the combustion chamber 54' is similar to the previously described combustion chamber having the inner and outer circular walls 55' and 56', but differs therefrom in the formation of the bottom wall or surface, which is preferably formed in a flat horizontal plane. The inner annular wall 56' is formed of a radially extending dividing baffle 74, composed of a suitable heat refractory material, which projects radially toward the center of the venturi discharge opening and functions to divide or part the entering flame laterally into the circular paths around each side of the burner. At a point diametrically opposite the dividing baffle 74 is a second baffle 75 which functions to deflect the outer strata of flame or mixture and turn it back upon itself, as indicated by the arrows. Part of the two divided portions reunite by colliding in front of the baffle 75, so that a diffusion of the two portions of flame and mixture takes place in this region. This diffusion of flame or mixture spreads out over approximately the entire rear section of the combustion chamber. The theory of dividing the entering flame or mixture in this manner and then bringing the two divided portions together and deflecting and diffusing the same over the entire area of the combustion chamber is primarily for the purpose of securing a uniform pressure of the flame or mixture over the entire chamber area for obtaining a uniformity of heat generation around the entire boiler. At the point of injection adjacent the Venturi tube the pressure of the flame or mixture is obviously highest. There is a natural tendency for this pressure to diminish with increase of distance from the point of injection. This condition is compensated for by the present practice of dividing the flame or mixture at the point of injection and then deflecting reuniting and diffusing the flame or mixture in a region which would be otherwise starved. As a result, the pressure in the rear portion of the burner is approximately the same as that in the front portion of the burner adjacent the point of injection, and consequently a uniform heating effect is had over the entire burner area.

In Figure 13 is shown still another modified form of burner of the same general arrangement as just described. In this form, both the inner and outer strata are deflected and turned back upon themselves to recirculate in the opposite direction. This is accomplished by a dividing wall 76, situated diametrically opposite the Venturi tube 61', which is provided with arcuate deflecting baffles 77, forming small circular pockets in which each strata of flame is deflected and turned inward toward the other to recirculate in the opposite direction. This oppositely circulating portion of flame, meeting with the entering strata, tends to establish a whirling vortex, somewhat as indicated, and by this action the flame is wrapped upon itself numerous times. This form of burner, as well as the forms previously described, have as one of their fundamental objects to utilize a long, high velocity flame in the limited space available. In the burner illustrated in Figure 8, and in the present form, it will be observed that the flame is either coiled in a helical path or is deflected back upon itself numerous times in order to permit of the maximum length of flame possible. This action of wrapping the long flame upon itself is equivalent to affording a larger combustion area. Recent tests also prove that the most efficient heat absorption by the boiler occurs when there is a high velocity impingement of the flame and gases on the boiler surfaces.

Figure 11:
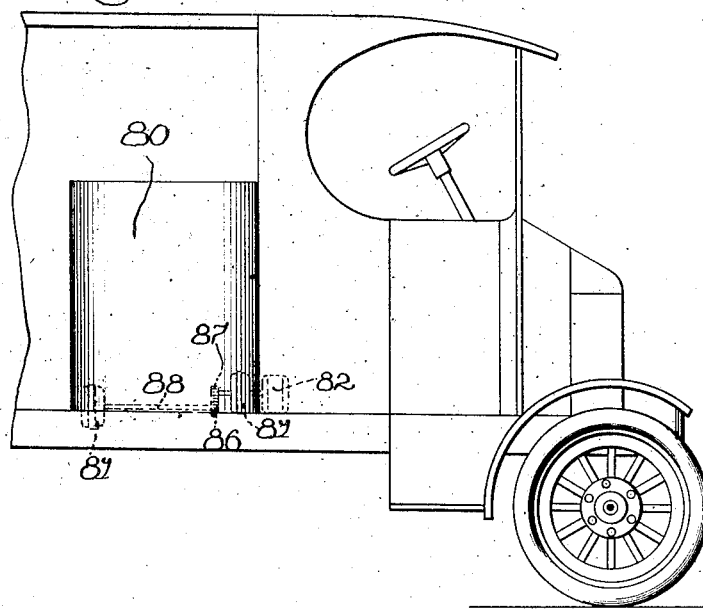
Figures 11 and 12 illustrate one particular application of the boiler to a steam vehicle.
Figure 12:
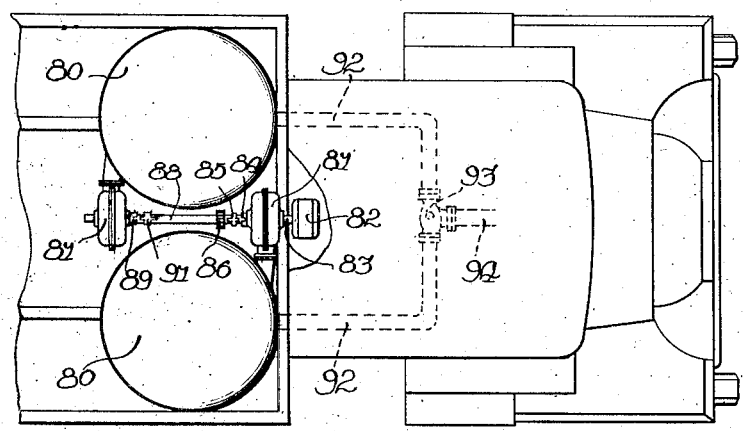

As I have previously described, the circular formation of the present boiler peculiarly adapts it to the space limitations existing in vehicle practice, and also to any situation where compactness is desirable. As illustrating certain novel and practical lines of development arising from the compact form and circumscribed dimensions of the boiler, I have shown in Figures 11 and 12 a battery of two boilers installed in a steam truck for the joint or independent generation of steam for propelling the truck. Each boiler 80 is an independent unit in and of itself and is capable of operating entirely independent of the other. The provision of the two independently operable units thus affords a reserve source of steam generation in the event of the disablement of one of the units. The two boiler units are preferably placed transversely to the chassis and as close together as the feed water and blower connections will permit. In the case of the boilers being arranged with the feed water connections under the headers as shown in Figure 7, the boilers can be placed nearly in contact, with just sufficient room between to accommodate the secondary blower shaft. Where the feed water headers are disposed outside of the boilers, one of the boilers can be placed slightly above the other so as to have the feed water pipes overlap. This placing of the boilers at slightly different levels also has the added utility of facilitating the location of the motor shafting for the blowers as I shall presently describe.

Each boiler has its own feed water apparatus and connections and its own individual blower unit 81 for its respective burner. The two blower units 81 are substantial duplicates and may be independently driven by separate electric motors, if desired, though for the purposes of a mutual control the preferred expedient is to drive both blowers from a common motor 82 thru a driving train which will permit of independent or simultaneous operation of the blowers. This latter operation can be accomplished by placing both blowers between the boilers and aligned in a common axial plane with the motor 82. This locates the blowers in the V-pockets between the boilers and contributes to securing a maximum degree of compactness of the battery of boilers. The shaft 83 of the motor 82 extends thru the axis of the adjacent blower 81 and over this shaft is sleeved the hub of the rotary impeller of said blower, as indicated at 84. Splined on the motor shaft 83 is a shiftable jaw clutch 85 which is adapted to engage with a similar clutch formation in the end of the sleeve 84. The motor shaft 83 is extended slightly beyond the shiftable clutch 85 where it is provided with a gear 86 meshing with a similar gear 87 on the secondary blower shaft 88. This secondary shaft 88 extends axially thru the other blower 81, which is situated slightly above or below the first blower to permit of the use of the gears 86 and 87. The rotary impeller in the second blower is also sleeved over the secondary shaft 88 as indicated at 89, and is adapted to be clutched thereto by a shiftable jaw clutch 91. It will be noted that the two blowers have discharge outlets facing in opposite directions for discharging into their respective burners, which are preferably of the tangential type. The provision of separate shafts for these blowers, geared together by the two gears 86 and 87 is for the purpose of obtaining opposite directions of rotation of the blowers whereby similar blowers of an identical stock design can be employed.

The clutching of either or both of the blowers to the electric motor drive may be effected in any suitable manner. The steam lines 92 from each boiler are extended to a joint control valve 93, by the operation of which either or both of the steam lines can be connected to the common steam supply pipe 94 extending to the throttle of the engine.

In addition to the advantage of affording a reserve source of steam generation, the use of a battery of boilers such as above described has the pre-eminent advantage of possessing a very desirable flexibility of disposal, to the end of utilizing to the utmost the space available for the boiler unit. For example, in the particular instance shown, which is applicable to most steam trucks, the most economical and efficient disposition of the boiler unit is extending transversely to the chassis immediately behind the driver's compartment. In such situation it is desirable that the entire transverse dimension of the chassis be utilized by the boiler, but without the introduction of excessive height or breadth of boiler. It will be seen that this has been readily accomplished by the use of the two boiler units in the particular arrangement shown. It will be noted that with this arrangement the height and breadth of the required boiler space are very much smaller than would be required with any circular or rectilinear boiler of unitary construction and of equal heating area. The flexibility of the battery of boilers and the ability of the several boiler units to utilize to a maximum a relatively long narrow space will be manifest. If desired, one boiler unit could be employed for generating the steam for propelling the vehicle and the other boiler unit could be utilized to supply steam for the operation pumping mechanism or other auxiliary apparatus on the vehicle.

Although I have described my invention with reference to a particular embodiment as required by the statutes, I do not intend thereby to limit the invention to any of the details herein described, as it is evident that numerous modifications will at once be apparent to those skilled in the art and I desire that all such modifications shall be considered as coming within the scope of the present invention.

What I claim as my invention is:

1. In a high pressure boiler, the combination of a plurality of independently functioning sections, each of said sections comprising an outer header and an inner header consisting of sections of tubing closed at their ends, a plurality of transverse tubes extending between said headers, said transverse tubes being spaced to form flue areas therebetween, said boiler sections being arranged in circular formation with each section radiating divergingly from a substantially central point, a manifold, and individual connecting tubes for each of said sections, each tube having threaded connection with a header of its section, and connecting at its other end to said manifold.

2. In a boiler, the combination of a plurality of independently functioning sections, each of said sections comprising an outer header and an inner header consisting of wrought metal tubes closed at their ends, a plurality of transverse tubes extending between said headers and welded thereto, said sections being arranged in circular formation with the sections radiating divergingly from a substantially central point, a centrally disposed manifold, and individual connecting tubes connecting with the outer header of each boiler section and extending across the flue area between said inner and outer headers for connection to said manifold.

3. In a boiler, the combination of a plurality of sections, each of said sections comprising an outer header and an inner header joined by a plurality of cross connecting tubes, said sections being arranged in circular formation with the outer headers substantially in contact and forming an outer circular water wall, and ascending and descending flue passes within the circular enclosure formed by said outer headers, one of said passes being surrounded by the outer headers and disposed between them and the inner headers and the other surrounded by and disposed within the inner headers.

4. In a boiler, the combination of a plurality of vertical independently functioning sections arranged in circular formation, each of said sections comprising an outer header and an inner header joined by a plurality of generally horizontal connecting tubes, said outer headers being disposed substantially in contact to form an outer circular water wall, said inner headers being disposed substantially in contact to form an inner circular water wall, an annular combustion chamber adapted to circulate the products of combustion between said inner and outer water walls, means connecting the said annular combustion chamber with an area within the said inner water wall, and an exhaust flue adapted to draw the same products of combustion from the area within said inner water wall.

5. In a boiler, the combination of a plurality of independently functioning vertical sections, each of said sections comprising a relatively large outer header and a relatively small inner header joined by a plurality of generally horizontal connecting tubes, said sections being disposed in circular formation with each section extending substantially radially from the center of the boiler, said large outer headers forming a circular outer water wall, a steam manifold and an individual super-heating tube having a readily detachable coupling with the outer header of each boiler section and connecting with said steam manifold, said super-heating tube having sinuated loops in the flue area between said outer and inner headers.

6. In a boiler, the combination of a plurality of independently functioning sections including a relatively large outer header, a relatively small inner header, a plurality of cross tubes connecting said headers, said sections having their corresponding headers in contact to form inner and outer circular water walls, an annular flue between said water walls, a combustion chamber beneath said flue, a steam manifold, and superheating tubes disposed in said annular flue for connecting said sections with said steam manifold said latter tubes having readily detachable connections.

7. In a boiler, the combination of a plurality of sections each of said sections comprising an outer header, an inner header, and a plurality of tubes connected thereto, said sections being arranged in circular formation with the several sections extending radially from the center of the boiler, said outer and inner headers forming concentric outer and inner circular water walls, an annular heating flue between said outer and inner water walls, and a central exhaust flue defined by said inner water wall.

8. In a boiler, the combination of a plurality of independent vertical sections, each of said sections comprising a relatively large outer header and a relatively small inner header joined by a plurality of connecting tubes, said sections being arranged in circular formation with each section extending radially from the center of the boiler, said outer headers being placed in contact to form a circular outer water wall, said inner headers being placed in contact to form a circular inner water wall, an annular heating flue between said water walls, a central exhaust flue defined by said inner water wall, a combustion chamber below said annular heating flue, a steam manifold above said sections, a plurality of superheating tubes disposed in said heating flue, said superheating tubes connecting the upper ends of said outer headers with said steam manifold, and a feed water pipe having connection with the lower ends of each of said outer headers.

9. The combination of a plurality of radially extending sections, each of said sections comprising an outer and an inner header, and a plurality of tubes connecting said headers, said outer headers being disposed substantially in contact and forming an outer circular water wall, said inner headers forming an inner circular water wall, said outer and inner water walls defining an annular flue space therebetween, a central exhaust flue defined by said inner water wall, communicating with said flue space, and a combustion chamber between said water walls.

10. In a boiler, the combination of a plurality of radially extending sections, said sections each comprising an outer and an inner header and a plurality of tubes connecting said headers, said outer headers being disposed substantially in contact and forming an outer circular water wall, a circular supporting bar, said outer headers resting on said supporting bar, and means disposed centrally in said boiler and engaging with said inner headers for laterally supporting said sections.

11. In a boiler, a plurality of independent sections, each of said sections comprising a pair of headers and a plurality of circulating tubes connecting said headers, said headers being formed with different sectional areas to obtain different rates of circulation therein, the upper end of the larger header defining a relatively quiescent steam space, and a steam discharge pipe connecting with said steam space.

12. In a boiler, a plurality of independent sections, each of said sections comprising a pair of substantially vertical headers, and a plurality of circulating tubes connecting said headers, said headers being formed with different sectional areas to obtain different rates of circulation therein, the larger header extending below the lowermost circulating tube to provide a quiescent water space therein, the upper end of said larger header defining a relatively quiescent steam space, and a steam discharge pipe connecting with said steam space.

13. In a boiler, the combination of a plurality of independent sections, said sections being arranged in circular formation with each section extending substantially radially, said sections each comprising an outer and an inner header and a plurality of circulating tubes connecting said headers, said outer header being of relatively larger sectional area to obtain a reduced rate of circulation therein, the larger volume of said outer header affording a relatively quiescent water and steam space therein, the smaller volume of said inner header adapted for a rapid, violent circulation therein.

14. In a boiler, the combination of a plurality of independent vertical sections, said sections being arranged in circular formation with each section extending substantially radially, said sections each comprising an outer and an inner header and a plurality of circulating tubes connecting said headers, said outer header being of relatively large diameter to obtain a reduced rate of circulation therein, the upper end of said outer header defining a quiescent steam space, said inner header being of relatively small diameter to obtain a high rate of circulation therein, an annular fire flue defined by said outer and inner headers, a steam discharge pipe, connecting with the steam space of each outer header, and a feed water connection, connected to the lower end of each outer header.

15. In a boiler, the combination of a plurality of independent vertical sections, each of said sections comprising an outer and an inner header and a plurality of circulating tubes connecting said headers, said sections being arranged in circular formation with each section extending substantially radially, said outer headers forming a closed outer water wall, said inner headers forming a closed inner water wall, a casing surrounding said outer water wall, said casing comprising a cover for the top of said boiler, a combustion chamber at the bottom of said boiler between said outer and inner water walls, and a down-draft exhaust flue leading from within said inner water wall.

16. In a boiler, the combination of a plurality of independent vertical sections, said sections being arranged in circular formation with each section extending substantially radially, said sections each comprising an outer and an inner header and a plurality of tubes connecting said header, said outer headers forming a closed outer water wall, said inner headers forming a closed inner water wall, a base ring, upon which said outer headers are mounted, means for releasably attaching said outer headers to said base ring, supporting means within said inner water walls for laterally supporting said sections, a burner supported in the bottom of said boiler by said base ring and adapted to circulate products of combustion between said outer and inner water wall, and a casing surrounding said boiler and closing off the top thereof.

17. In a boiler, the combination of a plurality of independent vertical sections, each of said sections comprising an outer header and an inner header joined by a plurality of generally horizontal cross connecting tubes, said sections being arranged in circular formation with each section disposed substantially radially and with the outer headers of said sections substantially in contact to form an outer water wall, an annular flue space defined in part by said outer water wall, a circular, open combustion chamber for circulating products of combustion through said flue space, fuel supply means for injecting a combustible fuel substantially tangentially into said chamber, and means for revolving said fuel in said combustion chamber and in said flue space during its process of combustion.

18. In a boiler, the combination of a plurality of independent sections arranged in circular formation, each of said sections comprising an outer header and an inner header joined by a plurality of connecting tubes, said outer headers being disposed substantially in contact to form an outer circular water wall, means for supporting said outer headers, and a ring shaped feed water pipe disposed adjacent said outer water wall, and having feed water connection with each of said outer headers.

19. In a boiler, the combination of a plurality of vertical sections arranged in circular formation, each of said sections comprising an outer header and an inner header joined by a plurality of connecting tubes, said outer headers being disposed substantially in contact to form an outer circular water wall, a circular supporting bar upon which rests said outer headers, a ring shaped feed water pipe disposed adjacent said outer headers and a plurality of releasable feed-water connections for connecting said feed-water pipe with each of said outer headers.

20. In a circular sectional high pressure water-tube boiler, a section comprising an outer header, an inner header and water-tubes extending between said headers, said tubes having their inner ends lying in a single vertical row and having their outer ends staggered.

21. In a sectional round boiler, a series of radial sections having inner headers and outer headers connected by cross tubes, said headers being substantially in contact to define an annular passageway between them, steam connections for the sections comprising a steam nozzle that is disposed at the top of each section, a manifold block located adjacent the top of the boiler, said block having convergent passageways and a common discharge nozzle, and connecting pipes having readily detachable connections for connecting said passageways with the steam nozzles of the individual sections.

22. In a round sectional boiler, a plurality of radial sections having outer headers and inner headers connected by cross tubes, the outer headers being substantially in contact to define an outer wall, discharge nozzles connected to the outer header adjacent the top thereof, a manifold block having a plurality of substantially radial passageways corresponding to the number of outer headers, a common steam delivery nozzle, and quick detachable connections between said radial passageways and the steam discharge nozzles of the individual sections.

23. In a round sectional boiler, a series of radial sections having inner and outer headers connected by cross tubes, a connecting block having a plurality of converging passageways, a common steam delivery pipe leading from said block and connecting with said passageways, and pipes having readily releasable connections connected between said passageways and the outer headers of the sections, said pipes being disposed between the cross tubes of the sections and forming a super-heater.

24. In a round sectional boiler, a plurality of sections arranged radially, said sections comprising inner and outer headers and cross connecting tubes, a manifold block having a plurality of passageways and a common discharge passageway and super-heater tubes connected to said manifold block and communicating with said passageways, said super-heater tubes having readily releasable connections and joining said manifold block with the outer headers of the sections.

In witness whereof, I hereunto subscribe my name this 29th day of November A. D. 1919.

WILLIAM H. WINSLOW.